United States Patent
Meggers et al.

(10) Patent No.: US 7,457,243 B2
(45) Date of Patent: *Nov. 25, 2008

(54) SCHEDULING AND ADMISSION CONTROL OF PACKET DATA TRAFFIC

(75) Inventors: Jens Meggers, Konigswinter (DE); Andreas Fasbender, Balmoral Park (SG)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 946 days.

This patent is subject to a terminal disclaimer.

(21) Appl. No.: 10/796,600

(22) Filed: Mar. 9, 2004

(65) Prior Publication Data

US 2004/0170198 A1     Sep. 2, 2004

Related U.S. Application Data

(63) Continuation of application No. 09/615,446, filed on Jul. 13, 2000, now Pat. No. 6,728,270.

(30) Foreign Application Priority Data

Jul. 15, 1999     (EP)     ................................. 99113820

(51) Int. Cl.
*H04J 3/14*     (2006.01)

(52) U.S. Cl. .................................. 370/230; 370/514
(58) Field of Classification Search ................. 370/392, 370/230, 395.4, 252
See application file for complete search history.

(56) References Cited

U.S. PATENT DOCUMENTS

| | | | | |
|---|---|---|---|---|
| 6,049,549 A * | 4/2000 | Ganz et al. | ................... | 370/449 |
| 6,169,740 B1 * | 1/2001 | Morris et al. | ................ | 370/397 |
| 6,580,721 B1 * | 6/2003 | Beshai | ......................... | 370/428 |
| 6,603,739 B1 * | 8/2003 | Dubuc | .......................... | 370/232 |
| 6,801,943 B1 * | 10/2004 | Pavan et al. | .................. | 709/226 |
| 6,876,668 B1 * | 4/2005 | Chawla et al. | .............. | 370/468 |
| 7,035,211 B1 * | 4/2006 | Smith et al. | .................. | 370/230 |

* cited by examiner

*Primary Examiner*—Brian D Nguyen

(57) ABSTRACT

A method, apparatus and software program is provided for scheduling and admission controlling of real-time data packet traffic. Data packets are admitted or rejected for real-time processing according to throughput capabilities of a packet scheduler. A delivery deadline is determined for each payload data packet at the packet scheduler and packets are sorted into a time-stamp-based queue. Deadline violations are monitored and an adaptation of payload data packets can be triggered on demand in order to enter a stable state.

21 Claims, 3 Drawing Sheets

SCHEDULING AND ADMISSION CONTROL OF PACKET DATA TRAFFIC

CROSS REFERENCE TO RELATED APPLICATIONS

This is a continuation of application Ser. No. 09/615,446 (now U.S. Pat. No. 6,728,270), granted Jul. 13, 2000.

FIELD OF THE INVENTION

The present invention relates in general to the processing of packet data traffic in a communications system, and in particular to scheduling of data packets and admission control.

BACKGROUND OF THE INVENTION

From the prior-art, there are two concepts known for the provision of quality of service in a packet oriented communications network.

One concept is the so-called Integrated Service Concept that is based on the reservation of resources for dedicated data packet streams. For the reservation of resources peer-to-peer signalling of requirements is needed before a transmission of payload data. All network nodes along a transmission path are requested to reserve corresponding resources. The Integrated Service Concept is described in: D. Clark et al., Supporting Real-time Applications in an Integrated Services Packet Network: Architecture and Mechanisms, Proceedings SIGCOMM 92, August 1992.

A known signalling protocol is the so-called Resource Reservation Protocol RSVP, that is described in: L. Zhang et al., RSVP: A New Resource Reservation Protocol, IEEE Network Magazine, September 1993. RSVP is a receiver-oriented simplex protocol that reserves resources in one direction along a communications path. The receiver of the data flow is responsible for the initiation of the resource reservation.

The so-called TENET scheme is similar to the Integrated Service Concept (see D.

Ferrari et al., A Scheme for Real-Time Channel Establishment in Wide Area Networks, IEEE Journal on Selected Areas of Communications, Vol. 8, pp. 368-379, 1990). It provides guaranteed delays for real-time services in a packet-switching wide-area network and allows bandwidth allocation per packet flow. In this scheme, clients declare their traffic characteristics and performance requirements at the time of communications channel establishment. After a channel is established, data packets are scheduled based on deadlines in the hosts and in the network nodes. In order to do so, a scheduler maintains at least three queues: one for deterministic packets, one for statistical packets, and the third for all other type of packets and all local tasks.

Another concept for the provision of quality of service is the so-called Differentiated Service Concept, which aims to simplify the classification and scheduling of packets with quality of service requirements by the use of priority bits in a protocol header. All packets belonging to a specific quality of service class will be marked with a corresponding priority bit combination in the Internet Protocol header. The packet flows are marked with the priority bits and policed according to a Service Level Agreement at the edge of the network. In the interior of the network, the packets are scheduled based on the priority bits. For the Differentiated Service Concept reference is given to S. Blake et al., An Architecture for Differentiated Services, IETF RFC 2475, December 1998.

Admission control of data packet streams and scheduling of the transmission order of data packets in order to minimise deadline violations of real-time or near real-time multimedia applications are important tasks in communication networks containing bottlenecks. In the following, the term 'real-time' should be understood also as 'near real-time' or, in general, as 'time-critical'. In heterogeneous networks, bottlenecks appear at network boundaries where traffic from one network is passed to another.

Certain real-time deadlines are usually not passed if only one data packet is delayed. Instead, usually a set of data packets spans up a synchronisation entity that has to arrive at the destination, e.g. to display a part of a multimedia output in time.

Application and intermediate nodes become more and more intelligent and allow for multimedia adaptation. This means that the amount of data bandwidth needed for the transmission of a certain multimedia object or presentation is not fixed. The adaptation process can be done by several means like dropping packets of lower priority, hierarchical multimedia coding, adaptive application, bandwidth adaptation gateways or even active networks that deploy processing elements within network nodes. Thus, in case of congestion, the bandwidth can vary in between a certain interval. The applications or the network itself may fulfil the needed adaptation task to vary the actual transmission rate in order to prevent deadline violations.

The existing admission control and scheduling schemes allow only for low bandwidth utilisation by means of peak rate allocations and delay guarantees that are given for bursty packet sources. Improved schemes are reaching a higher bandwidth utilisation by applying measurement algorithms that predict the actual available bandwidth by measuring the past bandwidth usage. However, measurement based algorithms provide only weak guarantees and only work efficient with a high amount of statistical multiplexing. Especially wireless networks are usually restricted in bandwidth capacity and thus, measurement based and deterministic admission control schemes have poor performances. One reason is that the existing schemes for packet scheduling are treating each packet in the same way. They are not able to detect past deadlines that are relevant for the receiving applications and thus, they cannot trigger processes that turn the current system into an error-free state.

Traditional schemes classify each packet stream into a priority class. In the Integrated Service Concept this priority class belongs to an average delay that packets of a particular stream will experience. In the Differentiated Service approach, this priority class belongs to a traffic type that should have less delay than other ones. The priority class is usually bounded to an average delay, the packet is expected to experience when admitted to that priority class. When considering multimedia streams with variable bit rates (like video streams), the packets of a single stream will not have the same delay requirements over the time. Instead, a scheduling by determination of a delivery deadline for each individual packet as proposed by the present invention provides a better performance than a priority based scheduling.

Therefore, it is an object of the present invention to provide an improved approach to packet oriented communications systems that overcomes these and other problems, in particular to allow a deadline-oriented scheduling of data packets carrying real-time data traffic.

The solution described in the invention is advantageous because of assignments of individual delivery deadlines to payload data packets that are subject to real-time processing.

This is especially useful for data packets of a single multimedia stream with variable bit rates, due to different delay requirements that the packets have over the time. The calculation of a delivery deadline for each individual payload data packet allows an optimal scheduling of the payload data packet via a time-stamp based queue. Advantageously, synchronisation control parameters necessary for determination of deadlines are read from a synchronisation control packet SCP that is embedded in an incoming data packet stream. This guaranties an easy processing of control parameters and avoids additional signalling and complex protocol structures.

In a preferred use, apart from synchronisation control parameters, parameters like a packet error rate Pj and a bit rate Rj of a transmission channel for data packets are incorporated in the deadline calculation. In this way, the current system characteristics can be easily taken into account, which results in an improved performance.

It is further advantageous to perform an admission control before delivery deadlines are calculated for payload data packets at a packet scheduler. The decision to admit a real-time processing of a sub-stream of data packets depends on a minimum throughput requirement given by admission control parameters, which can be easily read from an admission control packet ACP. Advantageously, delivery deadline violations for data packets due to throughput lacks can be avoided, because data packets requiring a higher throughput than available are not admitted for real-time processing. Also, unnecessary calculations of delivery deadlines are avoided.

It is advantageous that the admission control takes into account a maximum throughput parameter Rh. This allows the choice of a more cost-effective throughput than the minimum required throughput R1 for a sub-stream, up to the maximum throughput Rh and in dependence of the available throughput.

Furthermore, an upper throughput limit Rh can avoid buffer overflows in the communications system or at the receiver of the data packet stream, because it is guaranteed that data packets are not transmitted too fast.

It is also advantageous to reject a sub-stream of data packets, which is not admitted for real-time processing, and to send it to the packet scheduler, because this allows still a best effort processing. A dropping of data packets and a corresponding loss of information can therefore be avoided.

Data packets that are rejected for real-time processing are sorted at the packet scheduler into a second queue FIFO. in their order of appearance. This allows a best-effort processing according to a first in-first out strategy for data packets of the second queue FIFO.

Data packets from the first queue EDF are further processed according to their delivery deadlines, and data packets from the second queue FIFO are processed according to a first in-first out strategy. Advantageously, this puts the further processing of data packets under the established quality of service requirements into action.

An output interface OI prioritises data packets in the first EDF and the second queue FIFO. Advantageously, a blocking of data. packets in one queue can be avoided by choice of a priority-strategy, which guaranties to a certain extend read-outs of data packets from both queues.

A throughput capability feedback is sent back along the data packet sub-stream's transmission path via a modified admission control packet. Advantageously, this allows intermediate communications system nodes or a traffic source to adapt the traffic to the available throughput capabilities. In this way, rejections of data packets for real-time processing can be avoided to a high extend. The use of a modified admission control packet can avoid signalling overhead and a complex protocol structure.

Synchronisation control parameters are received from a header of an underlying network protocol. This allows payload encryption and authentication, and it supports the use of the so-called Internet protocols IPv4, IPv6 and IPSec, because synchronisation control parameters are not prevented from being read.

Deadline violations can be detected. Advantageously, this allows a triggering of countermeasures in order to guarantee the real-time processing of the data packets.

A payload data packet adaptation takes place. This allows the keeping of delivery deadlines for data packets. It supports furthermore an efficient use of the packet scheduler and other system resources, and it can avoid rejection or dropping of data packets.

Admission control parameters are received from a header of an underlying network protocol. This allows payload encryption and authentication, and it supports the use of the so-called Internet protocols IPv4, IPv6 and IPSec, because admission control parameters are not prevented from being read.

A network node that processes real-time data traffic comprises in addition a determining unit to determine a currently available throughput V, and a decision means for a decision about a real-time processing of an incoming data traffic flow. By means of the determining unit and the decision means it is possible to perform an admission control before deadlines are calculated for payload data packets at a packet scheduler. Advantageously, delivery deadline violations for data packets due to throughput lacks can be avoided, because data packets requiring a higher throughput than available are not admitted for real-time processing. Also, unnecessary calculations of delivery deadlines are avoided.

The network node comprises further a transfer unit to forward data packets that are admitted for real-time processing to the first queue EDF, and to forward data packets that are rejected for real-time processing to a second queue FIFO. This guaranties that all types of traffic can be processed. Data packets rejected for real-time processing can still be processed with best-effort quality. In addition, an output interface OI prioritises data packets in the first EDF and the second queue FIFO. Advantageously, a blocking of data packets in one queue can be avoided by choice of a priority-strategy, which guaranties to a certain extend read-outs of data packets from both queues.

The network node comprises further a deadline violation handler and an adaptation unit. Therefore, countermeasures against delivery deadline violations can easily be triggered in order to guarantee the real-time processing of the data packets. A preferred countermeasure is the payload data packet adaptation, which allows the keeping of delivery deadlines. It supports furthermore an efficient use of the system resources, and it can avoid a rejection or a dropping of data packets.

The network node comprises further a radio base station. In a cellular communications network, and in particular in a radio access network, the available frequencies are limited resources. This results in limited bandwidths of communications channels. Advantageously, the present invention supports efficiently the provision of quality of service to clients requesting real-time multimedia services. In particular, the radio base station can accept only those clients, whose communication requests can be fulfilled.

An admission control can easily be performed based on one or more admission control parameters RI read from an admission control packet ACP, which is embedded in a data packet stream. A decision to admit a real-time processing of a sub-stream of data packets depends on a minimum throughput requirement given by said admission control parameters. Advantegeously, congestion due to throughput lacks at network nodes or applications can be avoided, because data packets requiring a higher throughput than available are not admitted for real-time processing. In addition, the admission control can take into account a maximum throughput parameter Rh. Therefore, the admission controller can choose a more cost-effective throughput than the minimum required throughput RI for a sub-stream of data packets, up to the maximum throughput Rh and in dependence of the available throughput.

A network operator can charge different fees for different throughput rates provided to the customer. In order to increase the operator's profit, said choice of a throughput rate for a sub-stream can be based on a gain-function provided by an operator, said gain function indicating e.g. cost per throughput-rate for the communications system, a network node or a transmission channel.

Furthermore, an upper throughput limit Rh can avoid buffer overflows in the communications system or at the receiver of the data packet stream, because it guaranties that data packets are not transmitted too fast.

An admission control is performed before deadlines are calculated for payload data packets. There is no need to calculate deadlines, if throughput requirements for a real-time processing of a sub-stream of data packets that are given by admission control parameters indicate under consideration of available throughput capabilities, that these deadlines cannot be kept. Advantageously, delivery deadline violations for data packets due to throughput lacks can be avoided, because data packets requiring another throughput than available are not admitted for real-time processing.

A throughput capability feedback is sent back along the data packet sub-stream's transmission path via a modified admission control packet. Advantageously, this allows intermediate communications system nodes or a traffic source to adapt the traffic to the available throughput capabilities. In this way, rejections of data packets for real-time processing can be avoided to a high extent. The use of a modified admission control packet can also avoid signalling overhead and a complex protocol structure.

Data packets that are rejected for real-time processing are sorted into a second queue FIFO in their order of appearance. This allows an easy best-effort processing according to a first in-first out strategy for these data packets.

Data packets are prioritised for reading-out from the first queue EDF and the second queue FIFO. Advantageously, a blocking of data packets in one queue can be avoided by choice of a priority-strategy, which guaranties to a certain extend read-outs of data packets from both queues.

Deadline violations can be detected. Advantageously, this allows a triggering of countermeasures in order to guarantee the real-time processing of the data packets.

An adaptation of payload data packets is performed. This allows the keeping of delivery deadlines for data packets, in particular in the case of congestion or traffic load peaks. It supports furthermore an efficient use of system resources, and it can avoid rejection or dropping of data packets.

Admission control parameters and synchronisation control parameters are received from a header of an underlying network protocol. This allows payload encryption and authentication, and it supports the use of the so-called Internet protocols IPv4, IPv6 and IPSec, because admission control parameters are not prevented from being read.

A method, system and a computer program of the present invention will be further understood and appreciated from the following detailed description taken into conjunction with the figures. The following figures are showing:

DETAILED DESCRIPTION OF THE INVENTION

Figure 1A:
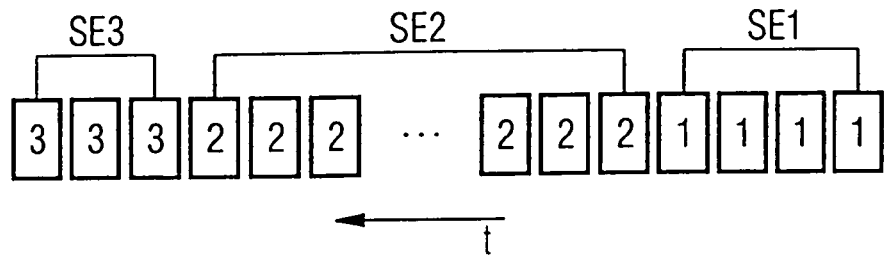
FIG. 1a a video stream with different synchronisation entities,
FIG. 1b another video stream with different synchronisation entities,
FIG. 1c a data packet stream with an admission control packet ACP and synchronisation control packets SCPs,
FIG. 2a parameters contained in a SCP,
FIG. 2b parameters contained in a ACP,
FIG. 3 tasks of an admission controller in a flow diagram,
FIG. 4 a functional view of a packet scheduler,
FIG. 5 tasks of a packet scheduler in a flow diagram.

FIG. 1a shows a payload data packet traffic stream along a time axis t. The stream can be sent by a traffic source or an intermediate network node in a communications system, or it can be received at a network node like a packet scheduler or an admission controller, or it can be received from a software application like a multimedia viewer. The payload data packet stream consists of several payload data packets 1, 2 and 3, which are sent or received over the time.

Depending on the characteristic of the payload, there are data packets that belong together and that build up a so-called synchronisation entity SE. Data packets belonging to a synchronisation entity SE have in common that all of them together must reach their destination within a fixed time interval due to real-time requirements. Furthermore, each synchronisation entity SE should have the property to be processed by the receiving application independently from any other packet of a succeeding synchronisation entity SE.

When considering video communication, a synchronisation entity SE could consist of one or more video frames, depending on the real-time characteristics and the playback buffer at the receiver. Regarding voice over internet protocol streams, the synchronisation entity SE could even be a single packet. In a so-called World-Wide-Web WWW session, the synchronisation entity SE can consist of data packets representing a whole web page including all objects like images and the Hypertext Markup Language HTML document structure.

In FIG. 1a, all payload data packets 1 belong to a first synchronisation entity SE 1, all payload data packets 2 belong to a second synchronisation entity SE 2 and all payload data packets 3 belong to a third synchronisation entity SE 3. This configuration puts restrictive delay requirements with respect to the overall end to end delays on a packet scheduler that receives the data packet stream in a communications network.

Figure 1B:
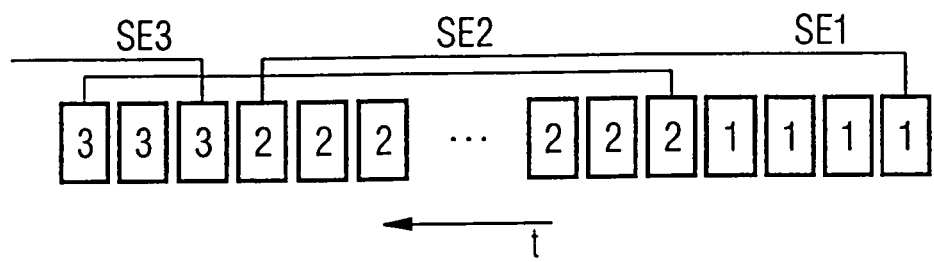

FIG. 1b shows in an alternative traffic scenario a video stream having two video frames within one synchronisation entity. The first video frame comprises payload data packets 1, the second frame comprises payload data packets 2. This scenario forces the receiver to buffer two synchronisation entities before playback. Here the synchronisation entity SE 1 overlaps the synchronisation entity SE 2.

Figure 1C:
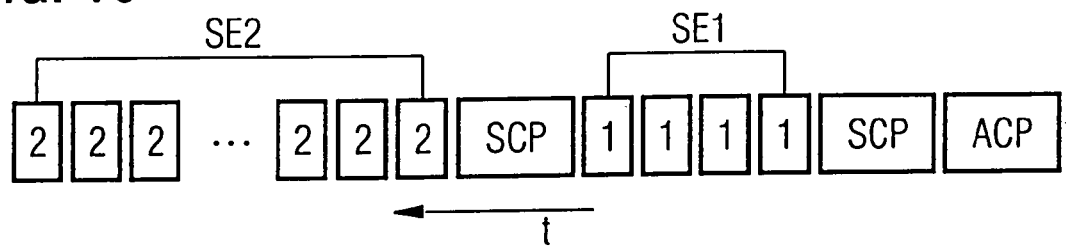

FIG. 1c shows a data packet stream without overlapping synchronisation entities. Certain control data packets SCP, ACP are embedded into the stream by a traffic source or an intermediate gateway. A synchronisation control packet SCP precedes a synchronisation entity SE, and it distinguishes one from another. It contains synchronisation control parameters related to the succeeding synchronisation entity SE.

In a preferred embodiment of the present invention a traffic source inserts in addition admission control packets ACP into the packet stream. An admission control packet ACP includes parameters that characterise a sub-stream of data packets regarding its throughput requirements for real-time processing. A sub-stream shall be understood as a set of data packets that follows an admission control packet ACP until another admission control packet. Alternatively, the number of data packets assigned to an admission control packet could be included in the admission control packet as a control parameter defining the sub-stream by its length.

The identification of payload data packets as belonging to a certain synchronisation entity SE or to a certain sub-stream via a number that is included as a control parameter in the synchronisation control packet SCP or in the admission control packet ACP and that defines the length of the synchronisation entity or the sub-stream can preferably be used, if real-time data traffic and other data traffic like best-effort traffic are mixed in one packet data stream.

Admission control packets ACP may be repeatedly sent while the data transmission holds on. A traffic source may use in this way admission control packets ACP to signal changes in its resource usage.

In a further embodiment of the present invention, the admission controller sends back a modified admission control packet ACP towards the packet source. This mechanism enables intermediate nodes or the packet source to react on negative admissions of data packets for real-time processing.

Admission control packets ACP can be repeated also at arbitrary time intervals, in order to refresh resource reservations. The possibility to repeatedly send them is especially useful in networks where the routing path of a multimedia stream may change, like in the fixed network part of a mobile communication network. A copy of the actual admission control packet ACP can then be forwarded from dedicated control nodes or can be even repeated within the packet stream in regular time intervals to allow control nodes at network bottlenecks the determination of actual resource requirements.

In a further embodiment of the present invention, the synchronisation control parameters and admission control parameters are inserted from the traffic source or an intermediate gateway into the header of an underlying network protocol. This is especially useful, if payload encryption and authentication mechanisms are used. Internet protocols like IPv4 and IPv6 allow inserting an optional header extension that can carry the admission control and synchronisation control parameters. When using the so-called IPSec protocol, the Internet protocol header is authenticated by an additional authentication header. Therefore, the reading of admission control and synchronisation control parameters is not prevented.

In a further embodiment of the present invention an intermediate station between source and packet scheduler has a key knowledge of the transmitted data packet stream. It forms a trusted device for the end-user, like e.g. a mobility gateway maintained by a network provider. In this case, special header and payload encryption for the transmission over a wireless link are used when so-called IP tunnelling takes place between communications parties.

Figure 2A:
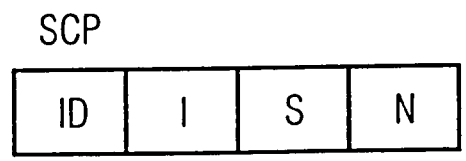

The present invention allows with the help of the synchronisation information contained in the synchronisation control packet SCP the determination of an individual delivery deadline for each payload data packet of a synchronisation entity SE, e.g. at a packet scheduler. FIG. 2a shows a preferred embodiment of the content of a synchronisation control packet SCP. It contains as parameters a number N of packets that belong to its referred synchronisation entity SE, an overall size S of all payload data packets of this synchronisation entity SE and a maximum transmission time I, in which the whole synchronisation entity SE has to pass the packet scheduler.

Alternatively, the maximum transmission time I could be defined as the time, in which the synchronisation entity SE has to reach its final destination. In this case, the packet scheduler would be allowed to use up only a part of this transmission time for processing of the synchronisation entity SE.

In addition, the synchronisation control packet SCP may contain an identifier ID that refers to the belonging admission control packet ACP. This identifier can be used to verify whether a synchronisation entity belongs to a certain sub-stream.

Additionally, the synchronisation control packet may contain other parameters, which support the identification of payload data packets as belonging to its control parameters. This might be necessary, if the transmission order of data packets is changed during their transmission from a traffic source or an intermediate network node to the packet scheduler, to another network node, or in general, to a device or an application, which utilises the synchronisation control parameters.

Supposing the transmission order of the data packet is not changing, packets are belonging to a specific synchronisation entity SE when they follow up an synchronisation control packet SCP and have not an index greater then N, starting at the first packet that follows directly the synchronisation control packet SCP. In order to distinguish synchronisation entities SE belonging to different packet flows, data packets can also be marked with a flow label by an underlying network protocol. The synchronisation control packet SCP carries the same flow label than its data packets.

In general, a synchronisation control packet SCP contains parameters necessary for determining delivery deadlines of payload data packets belonging to a synchronisation entity SE. Depending on the traffic type and the corresponding applications, in a certain embodiment of the present invention the synchronisation control packet SCP may contain just one parameter like an absolute or relative time value for a deadline. In another scenario, a synchronisation control packet may contain additional control parameters used inter alia for a re-arrangement of the data packet order. Therefore, the content of the synchronisation control packet SCP as shown in FIG. 2a should be understood only as one possible embodiment.

Figure 2B:
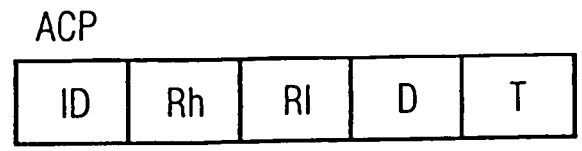

FIG. 2b shows a preferred embodiment of admission control parameters contained in an admission control packet ACP. An admission control packet ACP contains, in general, throughput parameters characterising the throughput requirements due to real-time constraints for the processing of a sub-stream of data packets by a packet scheduler. A throughput requirement in the sense of the present invention can be either a fixed requirement or an average requirement, and it can be given either by fixed throughput rate parameters or by average throughput parameters.

The parameter R1 gives the lowest required throughput that is necessary for real-time processing of the sub-stream. If this minimum requirement cannot be fulfilled, the sub-stream has either to be rejected for real-time processing, or it has to be processed under a best effort strategy. For example, a mobile terminal could request via this parameter certain data throughput conditions to be provided by the access network's radio base station. Then the radio base station decides, whether the mobile station can be accepted as a client.

Additionally, by an optional parameter Rh a highest desired throughput can be requested. This allows the admission controller, or in general a network node or an application, to choose a throughput rate within the given interval of minimum required throughput Rl and maximum desired throughput Rh. Said choise might be based on a gain-function provided by a network operator, e.g. a linear gain function indicating cost or profit per throughput, or it might be based on other cost-estimations. Said choice of a certain throughput according to a gain function might also influence one or more sub-streams of data packets, or in general communications connections, that have been admitted already by the admission controller for real-time processing at the packet scheduler, each with a certain throughput. Their throughputs might be decreased in order to increase the throughput that is available for a sub-stream, or in general a communications connection, that is currently under the process of admission by the admission controller. Therefore, the profit for a network operator can be increased by fulfilling the most monetarily valuable throughput requirements up to the upper throughput value Rh.

Furthermore, the limit Rh of the data throughput might be necessary due to buffer limitations or processing-speed restrictions at the data packet's destination-application. An exceeding of the maximum data throughput condition could cause inter alia buffer overflow errors or the rejection of payload data packets at the receiver's site.

A further optional parameter is a maximum scheduling tolerance D for use in the case of delivery deadline violations of payload data packets. The parameter D gives the tolerance, of which either a single payload data packet, a synchronisation entity or the whole sub-stream might be delayed.

Furthermore, an optional type parameter T characterises the type of data traffic, e.g. MPEG, Voice over IP or others. According to the traffic type, a packet scheduler can select an appropriate adaptation method for payload data packets in the case of deadline violations.

In addition, the admission control packet ACP may contain an identifier ID to be used to identify synchronisation control packets that belong to the sub-stream controlled by the admission control packet ACP.

Additionally, the admission control packet may contain other parameters, which support the identification of data packets as belonging to it. This might be necessary, if the transmission order of data packets is changed during their transmission from a traffic source or an intermediate network node to the packet scheduler, network node, or in general, to the device or application, which utilises the admission control parameters.

Figure 3:
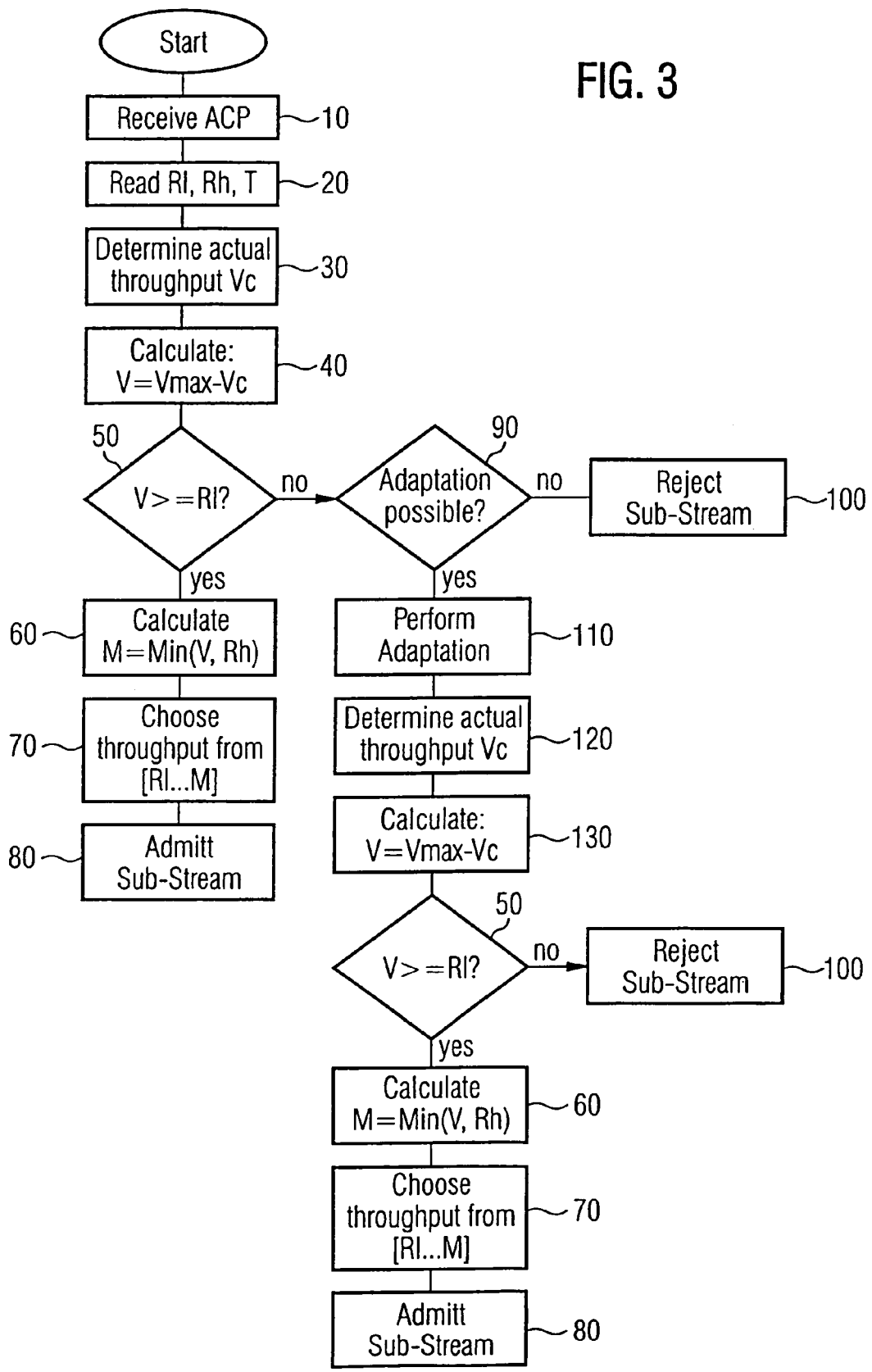

FIG. 3 describes in a preferred embodiment of the present invention the admission control. An admission control packet ACP is received at an admission controller 10, or in general, at a network node or an application. The admission control packet ACP refers to a following sub-stream carrying real-time data traffic. The admission controller reads out admission control parameters Rl, Rh, T from the admission control packet ACP 20. In one embodiment, the controller reads out just the minimum throughput parameter Rl. In another embodiment, shown in FIG. 3, the controller reads out the three parameters Rl, Rh, T.

Then, the admission controller determines the currently used throughput Vc at the controller 30. This can be done inter alia by counting of a number of bits that are transmitted currently by the admission controller per time. In particular, the measurement of the currently used throughput might take into consideration real-time data traffic only, because the delivery of other traffic type can easily be delayed without any time constraint violations. In the latter case, the packet scheduler might provide the currently used throughput parameter Vc, because the packet scheduler knows the type of traffic, which is currently processed.

In the next step 40, the admission controller determines the available throughput V by calculation of the difference between the maximum available throughput Vmax at the controller and the currently used throughput Vc. The admission controller knows the maximum throughput capability Vmax either as a fixed value, from a lookup-table, by channel measurements, by messaging or by a request.

Then, the controller compares the available throughput V with the required throughput Rl 50. If the available throughput V is higher than or equal to the required throughput Rl, the controller can admit the real-time processing of the sub-stream of data packets that belongs to the admission control packet ACP. In the embodiment shown in FIG. 3, the admission controller in addition calculates a minimum M of the available throughput V and the maximum desired throughput Rh 60. In the next step 70, the admission controller chooses a most monetarily valuable throughput rate for the sub-stream from a range given by the minimum required throughput Rl and by the minimum M. This can be done by a choice according to a gain function provided by a network operator, e.g. a linear throughput-profit function.

In another embodiment, the controller could preliminary choose a monetarily valuable throughput rate out of the range given by the minimum required throughput Rl and the maximum throughput Rh. If the chosen throughput value is not available, the controller can trigger an adaptation of sub-streams that are already admitted for real time processing at the packet scheduler in order to make said chosen throughput value available. Data packets of a sub-stream that is admitted for real-time processing are sent to a packet scheduler 80. The information, whether they are admitted for real-time processing, can be given from the admission controller to the scheduler either via signalling or by use of a dedicated transmission channel or a dedicated port at the packet scheduler reserved for real-time traffic. If a throughput rate has been chosen, it can be communicated to the packet scheduler or to an output interface OI in a similar way in order to be considered for a further processing of the sub-stream.

Data packets of a sub-stream that is not admitted for real-time processing are rejected. One way to perform this rejection is the dropping of data packets by the admission controller with or without further notice to another party like the traffic source, an intermediate gateway or the receiver. One way of notification can be to send from the admission controller a modified admission control packet ACP containing a negative acknowledgement, but also other signalling mechanisms could be used. Alternatively, data packets that are subject for rejection can be buffered, and a negotiation with the sender (traffic source or intermediate gateway) about the throughput requirements can be started (e.g. via an exchange of admission control packets). In another embodiment of the invention data packets of a sub-stream are sent to a packet scheduler for regular processing instead of real-time processing.

The regular processing then follows e.g. a best effort approach or a FIFO-strategy (first in-first out). The information, whether data packets that are sent to the packet scheduler are admitted for real-time processing, is given, as described above, to the scheduler either via signalling or by use of a dedicated transmission channel or a dedicated port for this transmission.

In the embodiment of the present invention shown in FIG. 3, a feasibility of an adaptation of data packets that are currently scheduled for real-time processing at the packet scheduler and that occupy the currently available throughput Vc is checked 90 and, if feasible, performed to increase the available throughput V at the packet scheduler 110. If the adaptation is not feasible, the sub-stream is finally rejected 100.

An adaptation of payload data packets that are currently scheduled for real-time processing, e.g. in a earliest-deadline-first queue EDF, can be done for example either by using of a different or more effective compression scheme, by dropping of certain packets or other traffic type dependent mechanisms. The appropriate adaptation method is chosen under consideration of the data traffic type T, like e.g. decreasing the resolution of a MPEG video-stream, dropping of some Voice over IP packets, converting 256-colour pictures to 16-color pictures etc. Usually, these well-known methods of adaptations can be performed 'on the fly' and result in a higher available throughput V.

After said adaptation, the currently used throughput Vc is determined 120, and the available throughput V is calculated 130. Then a final decision according to the above described criteria 50 and including the above described choice of a throughput value 60, 70 is taken about admission 80 or rejection 100 of the sub-stream for real-time processing.

Figure 4:
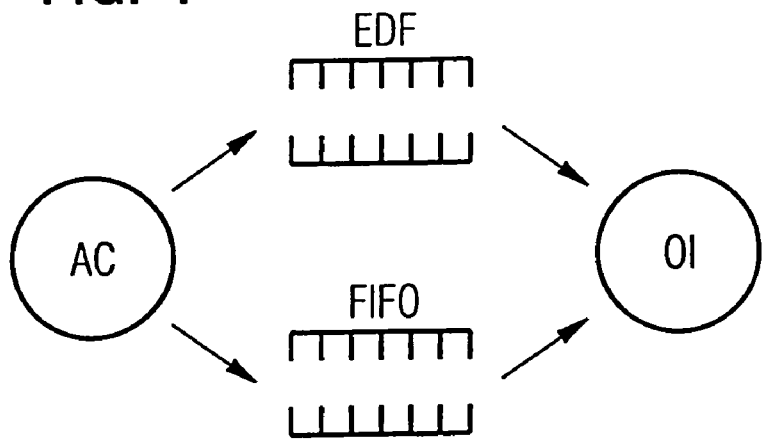

FIG. 4 shows a packet scheduler that includes an admission controller AC for admitting or rejecting a sub-stream of data packets for real-time processing, a first queue EDF for data packets admitted for real-time processing, and a second queue FIFO for data packets to be processed according to a best effort strategy like first in-first out. The second queue FIFO is used for data packets, which are rejected for real-time processing. Further embodiments of the packet scheduler may include more than one time-stamp based EDF queue and more than one FIFO queue, e.g. in order to increase the capacity of the scheduler.

By sending a sub-stream of data packets to the first queue EDF, the admission controller admits data packets for real-time processing. This first queue EDF is time-stamp based and operates according to an earliest-deadline-first strategy. Each data packet sorted into the EDF queue gets a time stamp, whose value is set to a delivery deadline of the data packet, which can be calculated from synchronisation control parameters provided by a synchronisation control packet. For the read-out, the EDF queue provides always the data packet with the closest delivery deadline. Therefore, the EDF queue can keep track of all delivery deadlines and corresponding data packets for a direct-access processing of a data packet with the closest delivery deadline, or alternatively, it can re-sort the payload data packets according to their delivery deadlines after each new data packet transmitted into the EDF queue to provide in a way of sequential processing always the data packet with the closest delivery deadline at the output of the EDF queue.

The packet scheduler includes an output interface OI, which prioritises data packets contained in the queues for further processing. This comprises the choice of a queue, the read-out of a data packet from this queue, and the provision of the data packet for further processing. Different strategies for the choice of a queue are possible, like either preferring always the EDF queue until it is empty or until a certain threshold is reached, or a strategy that is based on a fixed rate of read-outs per queue, or a strategy of dynamically determining a read-out rate, e.g. under consideration of the traffic type T. The provision of data packets for further processing can be done by a transmission of data packets over a communications channel, by polling mechanisms or others.

Figure 5:
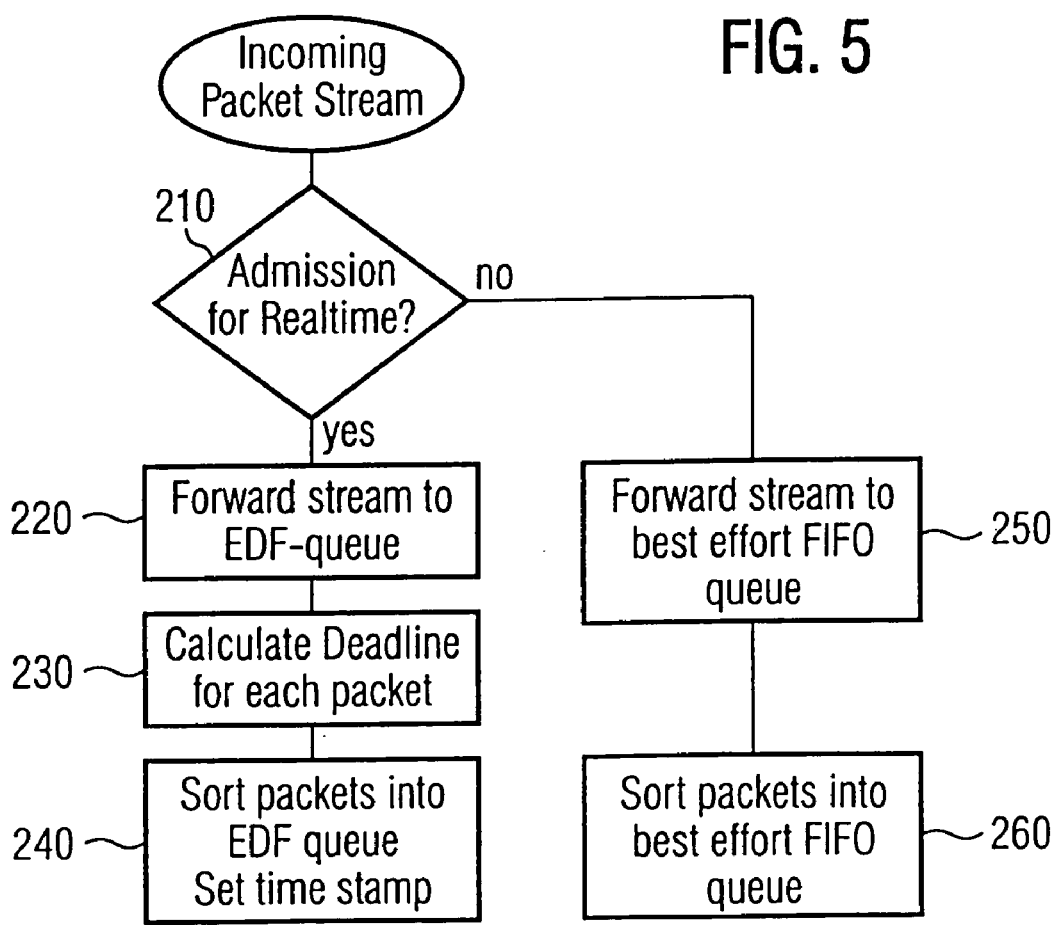

FIG. 5 shows tasks of a packet scheduler for an incoming sub-stream of data packets that is sent from an admission controller. If the sub-stream is admitted for real-time processing 210, an individual delivery deadline is calculated for each payload data packet 230. The admission for real-time processing can be recognised by the packet scheduler either via signalling messages received from the admission controller or via the arrival of a data packet over a dedicated communications channel or at a dedicated port reserved for real-time traffic. In the embodiment shown in FIG. 5 all data packets received at the packet scheduler and admitted for real-time processing are forwarded to the EDF queue 220, and all other data packets are forwarded to 250 and sorted into a second queue FIFO in their order of appearance 260, which is operated according to a best-effort strategy.

The packet scheduler reads synchronisation control parameters from a synchronisation control packet SCP received at the EDF queue for determining by calculation an individual delivery deadline for each payload data packet sent to the EDF queue. In a preferred embodiment, this deadline represents the latest allowed delivery time by the packet scheduler. Alternatively, the deadline could represent a latest arrival time at the data packet's destination. For the deadline, an absolute time or a timer-based time value can be used. In the next step 240, the payload data packet is sorted into the EDF queue and a time stamp of the EDF queue is set to the delivery deadline. The payload data packets sorted into the queues are ready for further processing, e.g. by an output interface OI, according to the description above.

In a preferred embodiment of the invention, the delivery deadline for an individual payload data packet is calculated from synchronisation control parameters S, N and I. Furthermore, a number i of the packet, and a current arrival time t of the packet are used for the calculation. In addition, a packet error rate $P_j$ and a bit rate $R_j$ of a channel j, for which the packet scheduler schedules the packet transfer for a further transmission are used in the calculation. The latter values indicate, how fast the real-time queue becomes empty.

The number i is the sequence number of a packet in a synchronisation entity SE, with $i \in \{1 \ldots N\}$. It is determined e.g. at the packet scheduler, by counting the incoming payload data packets that belong to a certain synchronisation entity SE.

The time value t represents an arrival time of the individual payload data packet at the admission controller. It can be determined by the admission controller and signalled to the packet scheduler. Alternatively, an arrival time at the packet scheduler could be used instead, if this time is not significantly different. In the latter case, the packet scheduler determines the packet's arrival time.

In general, the packet error rate $P_j$ is retrieved from link layer measurements. For example, in a so-called WCDMA system the packet error rate $P_j$ of a channel can be determined from a signal to noise ration by a so-called closed loop power control.

In other embodiments of the present invention, an error rate per timeslot, per client or per network can be used for the determination of the delivery deadline. In a preferred embodiment, selective repeat is used as link layer error correction.

The bit rate $R_j$ can be determined at the admission controller or at the packet scheduler, e.g. by counting of the incoming bits.

In a preferred embodiment of the invention, the deadline for each payload data packet is calculated as follows:

$$deadline_i = t + I - \frac{(N-i+1)*S}{N*(1-P_j)*R_j}, \text{ with } i \in \{1 \ldots N\}.$$

In a further preferred embodiment, the packet scheduler detects violations of delivery deadlines for payload data packets sorted into the EDF queue by comparing their delivery deadlines with an actual time value, e.g. the time a data packet has spent in the EDF queue, determined by use of a system time. If a violation is detected, an adaptation of payload data packets is performed according to the methods described earlier.

Different real-time applications allow different delay tolerances. One way to perform the adaptation in this context, is the use of the admission control parameter D, which defines a delay tolerance for a specific sub-stream of data packets. If a certain level of deadline violation is detected, an adaptive framework can degrade one or more sub-streams in order to enter a stable state.

The present invention can be embodied in a network node of a communications system, which comprises in general a packet scheduler and an admission controller. In particular, the present invention can be embodied in said network node by a packet error rate determining unit, which determines the packet error rate Pj of the communications channel j used for a further transmission of data packets from the network node, by a bit rate determining unit, which determines the bit rate Rj of said channel, by a timer, which determines a current arrival time t of a data packet at the network node, by an evaluation means, which evaluates control parameters I, S, N, Rh, Rl, D, T given by control data packets SCP, ACP emdedded in a data packet traffic flow, by a calculator unit, which calculates delivery deadlines, and by a first queue EDF, which receives data packets to be scheduled according to their deadlines.

In a further embodiment, the first queue EDF can contain a sorting unit, which sorts data packets into the first queue EDF, and which assigns calculated delivery deadlines as timestamps to these data packets. The sorting unit operates according to an earliest-deadline-first strategy.

Furthermore, the network node may include a determing unit, which determines a currently available throughput V, e.g. according to the method described earlier. A decision means admitts an incoming traffic flow or a sub-stream of data packets for real-time processing after it has checked throughput requirements given by admission control parameters and the available throughput V. In addition, the decision means may include e.g. a gain function via a look-up table in order to choose a most monetarily valuable throughput rate for a traffic flow or a sub-stream. The decision means can admitt or reject a real-time processing of data packets according to the method described above.

A second queue FIFO can receive data packets, which are rejected for real-time processing. A transfer unit builds an interface for a distribution of data packets, sub-streams or traffic flows to the appropriate queue, i.e. a rejected sub-stream to the second queue FIFO, and an admitted sub-stream to the first queue FDF.

An output interface can prioritise all queues according to the already described method.

The network node can include in addition an adaptation unit for adaptation of at least one payload data packet. The adaptation can be performed for data packets contained in the first queue EDF, or also for data packets that reach the network node. Furthermore, the network node can include a deadline violation handler, which monitors delivery deadlines of payload data packets sorted into the first queue EDF, and which initiates an adaptation of payload data packets in the case of delivery deadline violation in order to return to a stable system status. The adaptation can also be triggered by the decision means, e.g. based on a gain function in order to optimise the operator's profit.

In another preferred embodiment, packet scheduling and admission control is performed at a radio base station of a packet switched cellular radio access network. Alternatively, the invention may be used also in applications executed on end-user terminals.

In another embodiment, the present invention may be implemented as a computer program (also called application) or a computer program product for use with a processing device like a computer, a mobile phone or another communications device. The delivery of the computer program to said processing device can be done inter alia by read only memory ROM devices, so-called CD-ROM disks, floppy disks, hard disks.

Further to a normal operation of the processing device, software code portions of the computer program, respectively the computer program product by its stored program, perform a packet scheduling and/or an admission control, if the computer program is executed on the processing device.

In general, said computer program performs during execution instructions in the sense of the earlier described method for packet scheduling and/or admission control.

In particular, for admission control the software code portions of the computer program, which is loaded into a memory of and executed on a digital computer, perform first the step of detecting an admission control packet ACP in a data packet stream. This can be done by comparing a known structure of the admission control packet ACP with a structure of a currently received data packet. If an admission control packet ACP is found, its control parameters Rh, Rl are read out. In the next step, an available throughput V at the processing device is calculated as a difference of a total throughput Vmax that the processing device can handle and that is given as a fixed value to the application, and a currently occupied throughput, which can be provided by the processing device, e.g. by link layer measurements. In a further step, the computer program compares the required throughput Rl with the available throughput V. If the available throughput V is lower than the required throughput Rl, the sub-stream that belongs to the admission control packet ACP is rejected. Otherwise, a throughput value is chosen out of a range given by the required throughput Rl and a second throughput value. Said second throughput value is the minimum of the available throughput V and the highest desired throughput Rh. In another embodiment, the second throughput value is provided as it is described earlier from the processing device by a gain function. After the choice of said throughput value the sub-stream is admitted for real-time processing.

In a further embodiment, the software code portions performing the admission control generate a modified admission control packet, which comprises throughput capabilities like Vmax and V of the processing device. Said modified admission control packet is sent back along the transmission path of the sub-stream due to the earlier described reasons.

Additional software code portions of the computer program or alternatively, software code portions of a further computer program perform on execution a packet scheduling. First, a synchronisation control packet is detected in a data packet stream. Then, its synchronisation control parameters N, I and S are read out. For each payload data packet that belongs to a synchronisation entity SE that the synchronisation control packet SCP refers to, a delivery deadline is calculated after a packet error rate of a transmission channel j that is foreseen for a transmission of payload data packets from the packet scheduling application, a bit rate of said channel, and a timer value t, which indicates a current arrival time of payload data packets at said application, are determined, e.g. by measurements or by polling routines from the processing device. The payload data packets are sorted in the order of their deadlines into a queue EDF, which provides a time stamp for each data packet slot. Each time stamp of a slot is individually set to the calculated delivery deadline of that data packet sorted into the slot.

In a further preferred embodiment of the invention, delivery deadlines are calculated only for those data packets, which are admitted for real-time processing.

Data packets, which are rejected for real-time processing by the computer program, can be sorted in a second queue FIFO in order to be processed according to a best effort strategy.

Furthermore, the computer program may instruct the processing device to perform a prioritisation of both queues during read-outs of data packets in order to favour the processing of data packets admitted for real-time processing.

In a further embodiment, software code portions of the computer program instruct the processing device to monitor the delivery deadlines of payload data packets sorted into the first queue EDF by comparing an actual time value giving either an absolute or a relative time with the delivery deadlines stored in the time stamps. Doing so, the computer program can detect delivery deadline violations. In a further step, an adaptation of payload data packets of the first queue EDF can be performed, or alternatively, can be requested from a separate application.

In order to handle also data packet streams utilising payload data encryption or other security mechanisms, the computer program can provide software code portions to read synchronisation control parameters and/or admission control parameters from the header of an underlying network protocol, in addition to or instead of reading them from a data packet SCP ACP itself.

Furthermore, a method comprising the following steps can be performed: detecting in a data packet stream, which carries real-time data traffic, and which is received at an admission controller AC, a first admission control packet ACP comprising admission control parameters, reading at least two admission control parameters Rl, Rh from said first admission control packet, calculating a throughput V as a difference of a total throughput Vmax available at said admission controller AC and a currently occupied throughput Vc, comparing the throughput V with the required throughput Rl, and if the available throughput V is lower than the lowest required throughput Rl then rejecting a real time processing of a sub-stream of data packets that follows between said first admission control packet and a second admission control packet, or else choosing a throughput value from a range of throughput values, said range including as limits the lowest required throughput Rl and a second throughput value Rh, M and admitting a real-time processing of said sub-stream. In addition to the steps above, the step of generating and sending back from the admission controller AC along the sub-stream's transmission path a modified admission control packet comprising throughput capability parameters of said admission controller AC is preferably performed in a further embodiment.

Although both aspects are only described in combination in the claims, the steps of the latter described embodiments referring to aspects of admission control can optionally be independent of steps referring to aspects of synchronisation control. Both aspects can be implemented, e.g. by a corresponding method or a corresponding computer program, independently from each other.

While the invention has been described in connection with what is presently considered as practical and preferred embodiments, it is not limited to the disclosed embodiments, but on the contrary, it is intended to cover various modifications and equivalent arrangements included within the spirit and scope of the claims.

The invention claimed is:

1. A method for processing a data packet stream in a communications system, with the steps of:
   receiving a first admission control packet that includes a number of admission control parameters,
   reading from said first admission control packet at least one admission control parameter indicating a throughput required for a real-time processing of a sub-stream of data packets related to the first admission control packet, wherein the step of reading comprises reading a maximum throughput,
   determining a currently available throughput,
   comparing the available throughput with the required throughput,
   admitting the real-time processing of the sub-stream, if the available throughput is higher than or equal to the required throughput; and
   choosing for the sub-stream a throughput between the required throughput and a minimum of the maximum throughput and the available throughput;
   sending the sub-stream if it is admitted for real-time processing to a packet scheduler for real-time processing;
   determining a delivery deadline for a payload data packet of the sub-stream admitted for real-time processing;
   sorting the payload data packet into a first queue; and
   setting a time stamp, that is related to the sorted payload data packet, in the first queue to the determined delivery deadline.

2. The method according to claim 1, with the additional step of sending the sub-stream if it is not admitted for real-time processing to a packet scheduler for non-real-time processing.

3. The method according to claim 2, with the additional step of sorting the data packets of the sub-stream rejected for real-time processing in their order of appearance into a second queue.

4. The method according to claim 1, with the additional step of generating and returning from an admission controller along the sub-stream's transmission path a modified admission control packet comprising throughput capability parameters of said admission controller.

5. The method according to claim 1, with the further step of receiving at least one of the admission control parameters from a header of an underlying network protocol.

6. The method according to claim 1, with the additional steps of:
   sending the sub-stream if it is not admitted for real-time processing to a packet scheduler for non-real-time processing;
   sorting the data packets of the sub-stream rejected for real-time processing in their order of appearance into a second queue;
   further processing the data packets from the first queue according to their delivery deadlines; and
   further processing the data packets from the second queue according to a first in first out strategy.

7. The method according to claim 6, with the additional step of prioritizing by an output interface for the further processing data packets contained in the first queue and data packets contained in the second queue.

8. The method according to claim 7, with the further step of detecting a deadline violation by repeatedly comparing for payload packets sorted into the first queue their actual time spent in said first queue with their deadlines according to their time stamps.

9. The method according claim 8, with the further step of performing after detecting the deadline violation an adaptation of at least one payload data packet of the first queue.

10. A device in a communications system, comprising:
an evaluation means to evaluate at least one control parameter given by at least one control packet embedded in a traffic flow;
a determining unit to determine a currently available throughput of a network node;
a decision means to decide under consideration of the currently available throughput, whether an incoming data packet traffic flow can be processed at the network node according to real-time requirements given by admission control parameters;
a first queue for data packets that are admitted for real-time processing, wherein the first queue includes a sorting unit to sort data packets according to their deadlines into the first queue, said sorting unit following an earliest deadline first strategy, and wherein said sorting unit sets time stamps of the first queue according to calculated deadlines;
a second queue for data packets that are not admitted for real-time processing;
a transfer unit to forward a data packet traffic flow after a positive decision by the decision means to the first queue or after a negative decision to the second queue;
an output interface that prioritizes the queues and that reads out data packets from the queues;
a calculator unit for calculations of deadlines for data packets.

11. The device according to claim 10, further comprising:
a deadline violation handler for monitoring of deadlines of data packets, for a detection of at least one deadline violation, and for an initiation of an adaptation of at least one data packet, and
an adaptation unit for the adaptation of at least one data packet.

12. The device according to claim 10, further including a radio base station for receiving and transmitting of data packet traffic.

13. A computer program product within a computer readable medium stored thereon computer executable instructions for processing a data packet stream in a communications system, comprising:
instructions within the computer readable medium for receiving a first admission control packet that includes a number of admission control parameters;
instructions within the computer readable medium for reading from said first admission control packet at least one admission control parameter indicating a throughput required for a real-time processing of a sub-stream of data packets related to the first admission control packet, wherein the instructions for reading the at least one admission control parameter comprises:
instructions within the computer readable medium for the reading of a maximum throughput; and
instructions within the computer readable medium for choosing for the sub-stream a throughput between the required throughput and a minimum of the maximum throughput and a currently available throughput;
instructions within the computer readable medium for determining the currently available throughput;
instructions within the computer readable medium for comparing the available throughput with the required throughput; and
instructions within the computer readable medium for admitting the real-time processing of the sub-stream, if the available throughput is higher than or equal to the required throughput;
instructions within the computer readable medium for sending the sub-stream if it is admitted for real-time processing to a packet scheduler for real-time processing;
instructions within the computer readable medium for determining a delivery deadline for a payload data packet of the sub-stream admitted for real-time processing;
instructions within the computer readable medium for sorting the payload data packet into a first queue; and
instructions within the computer readable medium for setting a time stamp, that is related to the sorted payload data packet, in the first queue to the determined delivery deadline.

14. The computer program product according to claim 13, further comprising instructions for sending the sub-stream if it is not admitted for real-time processing to a packet scheduler for non-real-time processing.

15. The computer program product according to claim 14, further comprising instructions for sorting the data packets of the sub-stream rejected for real-time processing in their order of appearance into a second queue.

16. The computer program product according to claim 13, further comprising instructions for generating and returning from an admission controller along the sub-stream's transmission path a modified admission control packet comprising throughput capability parameters of said admission controller.

17. The computer program product according to claim 13, further comprising instructions for receiving at least one of the admission control parameters from a header of an underlying network protocol.

18. The computer program product according to claim 13, further comprising:
instructions for sending the sub-stream if it is not admitted for real-time processing to a packet scheduler for non-real-time processing;
instructions for sorting the data packets of the sub-stream rejected for real-time processing in their order of appearance into a second queue;
instructions for further processing the data packets from the first queue according to their delivery deadlines; and
instructions for further processing the data packets from the second queue according to a first in-first out strategy.

19. The computer program product according to claim 18, further comprising instructions for prioritizing by an output interface for the further processing data packets contained in the first queue and data packets contained in the second queue.

20. The computer program product according to claim 19, further comprising instructions for detecting a deadline violation by repeatedly comparing for payload packets sorted into the first queue their actual time spent in said first queue with their deadlines according to their time stamps.

21. The computer program product according to claim 20, further comprising instructions for performing after detecting the deadline violation an adaptation of at least one payload data packet of the first queue.

* * * * *

UNITED STATES PATENT AND TRADEMARK OFFICE
CERTIFICATE OF CORRECTION

PATENT NO. : 7,457,243 B2
APPLICATION NO. : 10/796600
DATED : November 25, 2008
INVENTOR(S) : Meggers et al.

Page 1 of 1

It is certified that error appears in the above-identified patent and that said Letters Patent is hereby corrected as shown below:

In Column 1, Lines 42-54, delete "Ferrari et al., ........ all local tasks." and insert the same in Line 41, after "(see D." as a continuation of the paragraph.

In Column 3, Line 46, delete "FIFO." and insert -- FIFO --, therefor.

In Column 4, Line 43, delete "OI" and insert -- OI --, therefor.

In Column 4, Line 66, delete "RI" and insert -- Rl --, therefor.

In Column 5, Line 11, delete "RI" and insert -- Rl --, therefor.

In Column 9, Line 8, delete "choise" and insert -- choice --, therefor.

In Column 13, Line 33, delete "emdedded" and insert -- embedded --, therefor.

In Column 13, Line 42, delete "determing" and insert -- determining --, therefor.

In Column 13, Line 45, delete "admitts" and insert -- admits --, therefor.

In Column 13, Line 51, delete "admitt" and insert -- admit --, therefor.

In Column 13, Line 59, delete "FDF." and insert -- EDF. --, therefor.

Signed and Sealed this

Twenty-eighth Day of April, 2009

JOHN DOLL
*Acting Director of the United States Patent and Trademark Office*